Jan. 18, 1927. 1,615,103
E. TEMENS
HYDRAULIC POWER APPARATUS
Original Filed Oct. 17, 1923
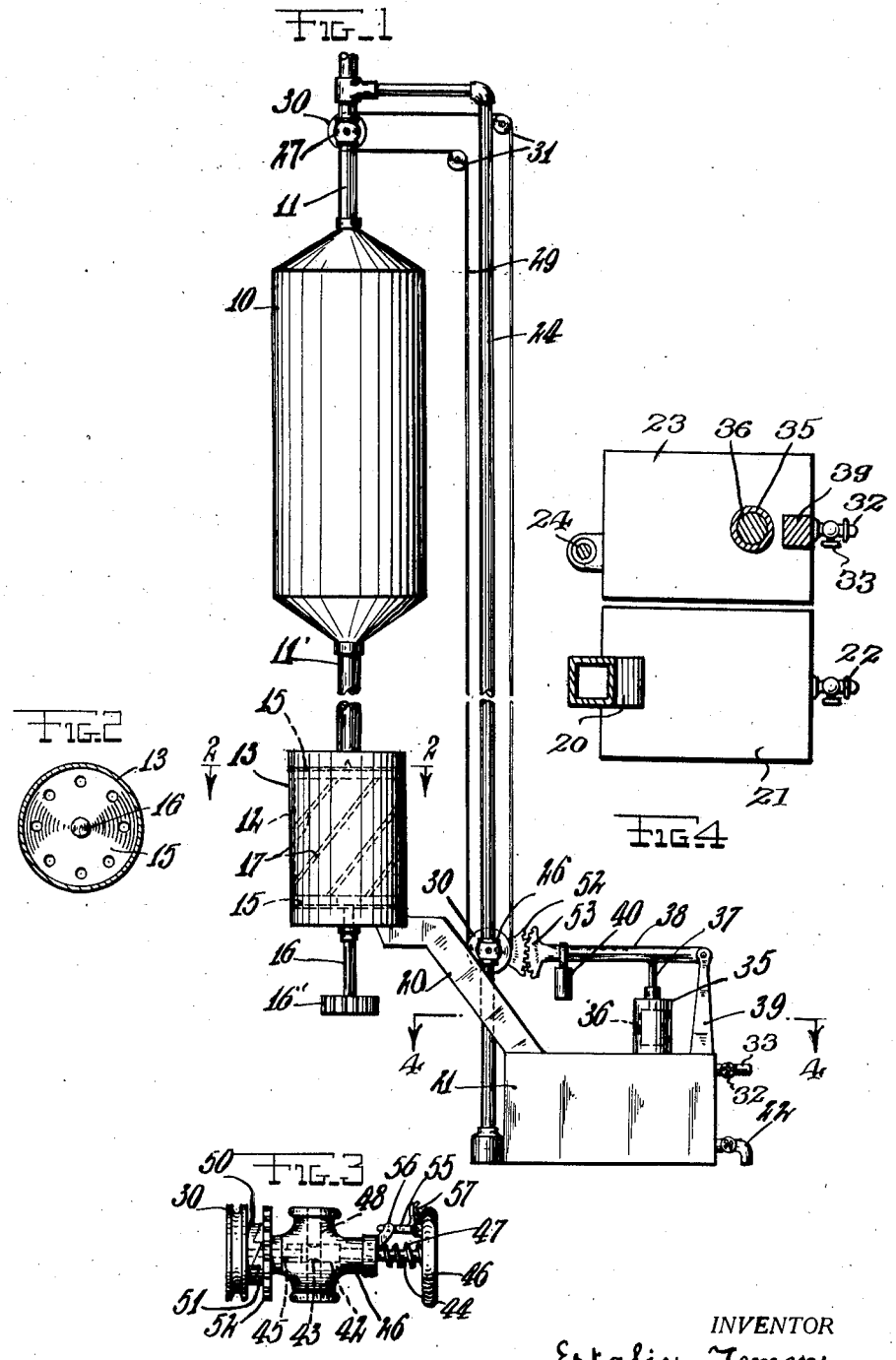
INVENTOR
Estafiy Temens
BY
ATTORNEY Patented Jan. 18, 1927.

1,615,103

UNITED STATES PATENT OFFICE.

ESTAFIY TEMENS, OF ELIZABETHPORT, NEW JERSEY.

HYDRAULIC POWER APPARATUS.

Application filed October 17, 1923, Serial No. 668,965. Renewed August 25, 1926.

This invention relates generally to hydraulic power apparatus, having more particular reference to apparatus in which a water wheel is driven by water falling from an elevation, the invention having for an object the provision of a novel apparatus of this type with which air compressing means is combined to operate in alternation.

For further comprehension of the invention, and of the objects and advantages thereof, reference will be had to the following description and accompanying drawing, and to the appended claims in which the various novel features of the invention are more particularly set forth.

Fig. 1 of the drawing is a side elevational view of my improved hydraulic apparatus.

Fig. 2 is a detail horizontal sectional view taken on the line 2—2 of Fig. 1.
Fig. 3 is a side elevation of the automatic control valve.

Fig. 4 is a detail horizontal sectional view taken on the line 4—4 of Fig. 1.

Referring now to the drawing the reference numeral 10 indicates a reservoir situated at any suitable elevation and receiving water from any available source through a pipe 11. The water is conducted from this reservoir through a pipe 11' to a water wheel 12 located at a distance below the reservoir and enclosed within a casing 13. Extending across the casing 13, a short distance from the top and bottom thereof, are partitions 15 which serve as journals for the shaft 16 of the wheel 12, and which are provided with apertures 15' for the passage of the water. The upper one of these partitions has the apertures therein arranged in a circular form and spaced radially a distance to direct the water upon the vanes 17 of the water wheel. The shaft 16 may have a gear 16' or other suitable power transmitting element on the projecting lower end thereof for connection to any device to be driven by the turbine or water wheel.

The water passing from the casing 10 may be carried through a conduit 20 to a receiving tank 21 and may be utilized for any desired purpose, a draw-off pipe being indicated at 22. I may also utilize the water to compress air in a second tank 23 here shown as located beside the tank 21, and to this end a branch 24 leads from the pipe 11 downward to the tank 23 communicating with the lower part thereof. Upon this pipe 24 is a valve 26 which is located slightly above the level of the top of the tank 23, while a valve 27 is placed on the pipe 11 just under the point where the branch 24 leads therefrom, so that when this valve is closed the water may be prevented from flowing to the reservoir 10 and directed along the pipe 24. The valves 26, 27 are preferably arranged to operate inversely in unison so that when one is closed the other is opened, and this is here effected by means of a rope 29 looped over pulleys 30 on the stems of the respective valves, this rope being led around suitable guide pulleys 31. A nipple 32, controlled by a valve 33, is fitted on the upper part of the tank 23. This nipple is adapted to have connected thereto a pipe or tube for conveying the compressed air away from the tank.

I preferably arrange means whereby the valve 26 is automatically closed, and the valve 27 opened, when the air pressure in the tank 23 reaches a certain selected point and to this end a cylindrical housing 35 is mounted on the top of the tank in communication with the interior thereof and has a piston 36 therein provided with a projecting rod 37 which is adapted to bear upward on a lever 38 fulcrumed at one end on a standard 39 on the tank 23, and having at its opposite end in operative relation to the stem of the valve 26. Upon the lever a weight 40 is hung and may be adjusted therealong to vary the pressure at which the valve is closed.

The valve 26 is illustrated in detail in Fig. 3 and comprises a casing in which is a rotary and slidable plug member 42 having the usual port 43 therein, stems 44 ad 45 projecting from opposite ends of this member through the casing walls, the stem 44 having a handwheel 46 thereon and having an expansion spring 47 coiled therearound and acting to hold the plug in position, longitudinally considered, in registery with the passages 48 in the valve casing. Upon the end of the other stem member 45 is fixed the pulley 30 and a cam disk 50 and between this disk 50 and the casing a second cam disk 51 is mounted freely on the said stem member 45 and has fixed thereto a gear segment 52 meshing with another gear segment 53 on the end of the lever arm 38. When the air pressure in tank 23 reaches the desired point the cam 51 will be caused to rotate and will close the valve by moving the port 43 in the plug element 42 axially out of registery with the passages 48 in the casing. Rotation of the plug element during this movement is prevented by a bellcrank latch 55 carried by the handwheel and normally engaging in a notched projection 56 on the casing, a spring 57 holding the latch in this position.

Having thus described my invention what I claim as new and desire to protect by Letters Patent of the United States is as follows:

1. In a hydraulic power apparatus, a water wheel, a supply pipe leading thereto from an elevated point, a closed tank, a by-pass pipe leading downward from said first pipe and connecting with said tank near the bottom of the latter, valves on the respective pipes connected to one another to operate inversely in unison, and a device arranged for operation by the air compressed in said tank as the water flows from said by-pass into said tank, to open the valve on the first named pipe and close the valve on the other pipe.

2. In combination with a pipe, a valve on said pipe including a plug adapted both for rotary and axial movement between open and closed positions, a handle on said plug for moving the same in a rotary direction, a cam element for moving the plug axially, and a releasable member locking said plug against rotary movement.

In testimony whereof I have affixed my signature.

ESTAFIY TEMENS.